Jan. 13, 1925

Re. 15,982

M. HAWIE

RUSTLESS BUCKLE

Original Filed Nov. 12, 1921

INVENTOR.

By Michael Hawie

Chamberlain & Newman

ATTORNEYS.

Reissued Jan. 13, 1925.

Re. 15,982

UNITED STATES PATENT OFFICE.

MICHAEL HAWIE, OF GREENS FARMS, CONNECTICUT, ASSIGNOR TO THE HAWIE MANUFACTURING CO., OF BRIDGEPORT, CONNECTICUT, A CORPORATION OF CONNECTICUT.

RUSTLESS BUCKLE.

Original No. 1,426,634, dated August 22, 1922, Serial No. 514,633, filed November 12, 1921. Application for reissue filed November 17, 1924. Serial No. 750,466.

*To all whom it may concern:*

Be it known that MICHAEL HAWIE, a citizen of the United States, and resident of Greens Farms, Fairfield County, and State of Connecticut, has invented certain new and useful Improvements in Rustless Buckles, of which the following is a specification.

This invention relates to a buckle, and has more especial reference to that type of buckle known as a "rustless back" buckle.

The object of the invention is to provide a simple and practical buckle of the character mentioned which will be effective in the performance of its intended function without the necessity of employing any stitching in incorporating a web with the buckle, and which will be conveniently constructed with particular reference to economy of webbing.

With the above and other objects in view the invention comprises the construction, arrangement and combination of parts as now to be fully described and as hereinafter to be specifically claimed, it being understood that slight changes in minor details of construction and arrangement of parts within the spirit of the invention may be made so long as within the scope of the claims.

In the accompanying drawing forming a part of this specification,

Figure 2:
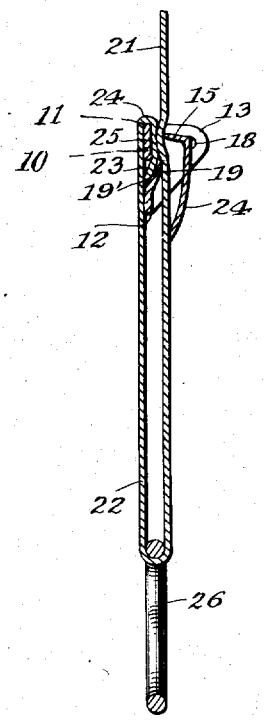
Fig. 2 is a sectional view on line 2—2 Fig. 1.

With respect to the drawing and the numerals of reference indicated thereon, it will be seen that the buckle is formed of two parts of sheet metal and comprises a frame-member and a lever-member. 10 denotes the frame-member of the buckle, 11 denotes the top edge of said frame, 12 denotes the bottom edge thereof, and 13 represents two ears extended forward in the same direction from the opposite ends of said frame and arranged at approximately right-angles thereto.

The lever member consists of an operating arm 14 and a clamping arm 15 having a series of teeth 16 and arranged at an approximate right-angle to the operating arm, and is provided with pintles 17, said pintles extending from the opposite ends of the lever member and situated at the junction between said operating and clamping arms. Numeral 18 represents perforations in the ears of the buckle frame for receiving the pintles 17.

Adjacent its bottom edge 12 the buckle frame is provided with a series of spaced apart teeth 19 preferably arranged along the full length of said frame and struck from said body to extend upwardly and forwardly therefrom, that is, to be situated upon the same side of the body as are the ears 13, the teeth desirably being of the approximate V-shape as stamped from the aligned V-shaped openings 19′ in the back. The integral portion 10′ left adjacent the sides of and between the teeth generally strengthens the structure rendering it more rigid and prevents the two edge portions from spreading and particularly serves as a stop which prevents the end of the web, when inserted, from protruding through the opening and co-acts with the teeth 19 in clamping the web and maintaining it firmly secured.

As will be most clear from the drawing, the pivotal points for the lever member are arranged above the teeth 19 and the teeth 16 of the clamping arm are given a circular movement with each operation of the lever. In this respect it will also be seen that the teeth of the clamping arm are arranged alternately with respect to the teeth of the back so that in the operation of the buckle, see Fig. 3, the teeth of the clamping arm pass between the teeth of the back to insure a free movement of the lever.

Numeral 20 represents a web having an upper reach 21 and a lower reach 22.

Figure 1:
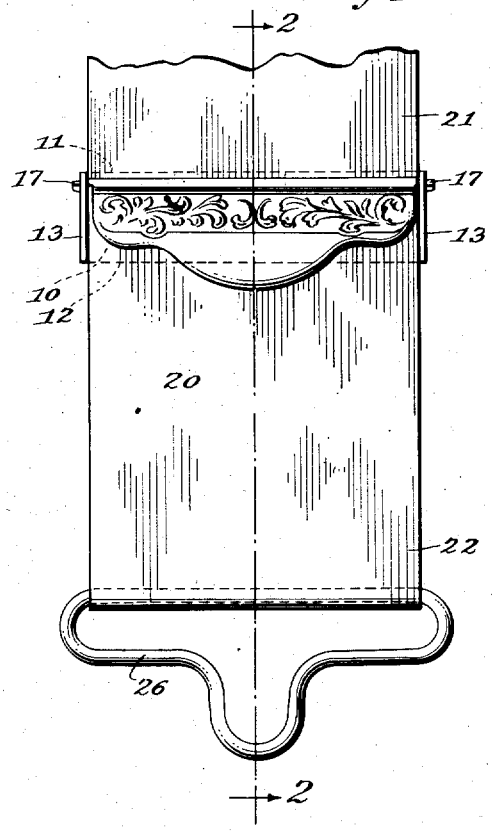
Fig. 1 is a fragmentary view in front elevation of the improved buckle as in use.
Figure 3:
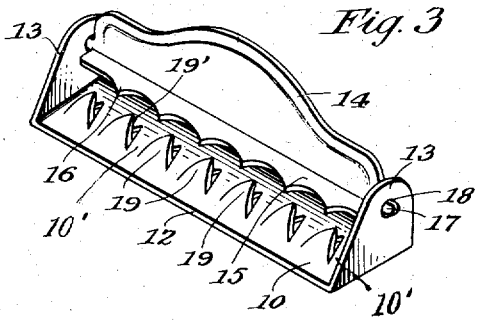
Fig. 3 is a perspective view of the buckle detached from the web.
Figure 4:
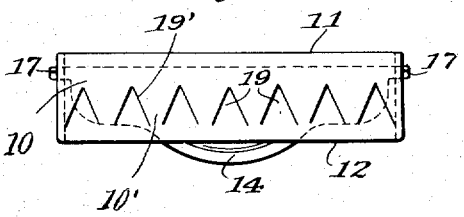
Fig. 4 is a rear elevational view of the buckle.

In assembling the web with the buckle, an end 23 of the web is passed downwardly in front of the frame and in the rear of the lever member, said lever at the time being positioned as in Fig. 3, and inserted between the teeth 19 and the front face of the frame. The aforesaid stop renders it easy and certain that in inserting the web. the front end thereof enters its seat beneath the teeth 19 instead of protruding through an uninterrupted opening and projecting at the back thereof which would present an unsightly appearance and might prove uncomfortable to the wearer. The teeth are then swedged back toward the openings 19′ in the frame to securely grip said end 23, the aforesaid stop co-acts with the teeth 19 in clamping the web and maintaining it secure with no liability of working free. This form of attaching by means of the spaced apart teeth engaging alternate portions of the end of the web and clamping the same in the openings of the back serves to leave exposed portions of the web between the teeth and which lay in alignment with the teeth of the lever member so as to form a yieldable back against which the adjustable portion of the web is clamped. The web is then extended upwardly and over to engage the upper edge 11 of the frame as at 24, and is extended downwardly across the rear face of the frame, as at 25 and below said face, to produce the lower reach on loop 22 for holding the usual cast-off 26. That portion of the web which is to comprise the upper reach 21 thereof is then passed upwardly in front of the frame-member and in rear of the lever-member, the lever-member being still arranged about as it is shown in Fig. 3, in open position. After the upper reach 21 has been adjusted in an obvious manner to the desired position, the operating arm is grasped and moved to the position of Fig. 1, so that the serrated edge of the clamping arm of the lever-member is in engagement with a part of said upper reach 21 to press said part firmly against a portion of the web closely adjacent end 23 thereof, and to in turn press said portion firmly against the front face of the frame-member. That is say, the lever-member is manipulated to firmly secure a double thickness of the web between the serrated edge of the clamping arm of the lever and the upper portion of the frame of the buckle.

The arrangement as fully described, evidently, provides a durable and efficient construction. The teeth of the clamping arm of the lever member are preferably arranged out of alignment with the teeth of the frame member so as to operate in front of the exposed portion of the webbing between the teeth of said frame-member to provide a more flexible and binding engagement with the running portion of the webbing when threaded therebeneath. The teeth 19 can be pushed back to the approximate plane of the frame, with the end of the web very securely fastened between the teeth and the frame, and the buckle lever clamping arm is ideally constructed to positively fasten the upper reach of the web in stationary position. The operating arm of the lever is arranged and constructed to engage the front face of that portion of the web comprising one of the laps of the loop when the clamping arm is in its proper clamping position.

Having thus fully described the invention, what I desire to claim and secure by Letters Patent is:

1. A rustless buckle comprising a sheet metal frame-member and a lever-member, said frame member including a back having forwardly projected ears and a series of spaced apart teeth struck up from said back intermediate its top and bottom edges and extending upwardly and forwardly, and leaving a stop integral with said back, the lever-member being pivoted in the ears of the frame and including an operating arm and a clamping arm arranged at an angle thereto and having a series of teeth arranged alternately with respect to the teeth of the frame and adapted in the operation of the lever to pass between and clear of the teeth of the said frame-member.

2. A rustless buckle comprising a frame-member and a lever-member, said frame-member being formed of sheet metal, and having forwardly extended ears, and a series of integral upwardly disposed teeth formed from its body portion leaving a stop integral with said body portion, said lever-member being pivotally supported in the ears of the frame-member and including an operating arm, and a clamping arm arranged at an angle thereto, in combination with a piece of web one end of which is engaged by the teeth of said frame-member and extended upwardly from said teeth and exposed between said teeth and across the front of said frame, thence over its upper edge and down covering the back of the frame, and continued to form a loop and finally extending upward under the clamping arm and in front of the before mentioned attached end portion of the web, so as to be adjustably secured against the web by the said clamping arm, the clamping arm of the lever-member being provided with a series of teeth that operate in alignment with the exposed portion of the web between the teeth of said frame-member to better form a yieldable back against which the adjustable portion of the web is clamped.

3. A buckle consisting of a frame having forwardly extending ears, and a lever having an operating arm and a clamping arm, the frame having teeth struck therefrom arranged above the lower edge of the frame and extending upwardly and forwardly leaving stops integral with said frame, and the lever being pivoted in the ears of the frame, said upwardly and forwardly extending teeth of the frame serving to secure one end portion of a web, the web extending upwardly from the teeth across the front face of the frame and between the ears thereof, thence over the upper edge of the frame, thence downwardly across and against the rear face of the frame and continuing to provide a loop, and finally extending upwardly across and in direct contact with the frame, teeth and before mentioned end portion of the web, and between the frame and lever to be engaged by the clamping arm of the lever and securely clamped against the first mentioned end portion of the web.

4. A buckle consisting of a frame having forwardly extending ears, and a lever having an operating arm and a clamping arm provided with teeth, the lever being pivoted in said ears, and the frame having upwardly and forwardly extending teeth struck therefrom and arranged in spaced relation to the lower edge of the frame and leaving a stop integral with said frame, said upwardly and forwardly extending teeth serving to fasten one end portion of a web to the frame, the web extending upwardly across the front face of the frame, and over the upper edge thereof, thence downwardly across and in engagement with the rear face of the frame to provide a loop, thence upwardly between the lever and frame to have direct engagement with the portion of the frame below the upwardly and forwardly extending teeth, with the teeth themselves, and with a considerable area of the first mentioned end portion of the web above the teeth and engaging the front face of the frame, to be better engaged by the teeth of the clamping arm of the lever and securely fastened against the first mentioned end portion of the web, whereby both sets of teeth constitute means for holding the first mentioned end portion of the web and said teeth of the clamping arm of the lever constitute means for insuring the position of the running end portion of the web, both reaches of the loop being parallel for the full length of the loop, and the body of the frame lying in a plane between the reaches of the loop and parallel with each reach.

Signed at Bridgeport, in the county of Fairfield and State of Connecticut, this 12th day of November, A. D., 1924.

MICHAEL HAWIE.